United States Patent
Rondestvedt, Jr.

[15] 3,681,453

[45] Aug. 1, 1972

[54] AROMATIC ACID CHLORIDE PROCESS

[72] Inventor: Christian S. Rondestvedt, Jr., Wilmington, Del.

[73] Assignee: E. I. du Pont de Nemours and Company, Wilmington, Del.

[22] Filed: Nov. 10, 1969

[21] Appl. No.: 875,541

[52] U.S. Cl. ............................................. 260/544 M
[51] Int. Cl. .................................................. C07c 51/58
[58] Field of Search ....................... 260/544 M, 524 S

[56] References Cited

UNITED STATES PATENTS 2,928,879  3/1960  Strickland .................... 260/599

FOREIGN PATENTS OR APPLICATIONS 1,302,418  7/1962  France

*Primary Examiner*—Lorraine A. Weinberger
*Assistant Examiner*—Richard D. Kelly
*Attorney*—Francis J. Crowley

[57] ABSTRACT

Process for preparing aromatic acid chlorides such as isophthaloyl chloride and terephthaloyl chloride, useful as intermediates for making polyester, polyamide and the like condensation polymers, which includes heating an aromatic compound containing at least one dichloromethyl group bonded to an aromatic carbon atom with a sulfur reactant ($SO_2$, $SOCl_2$ or mixtures thereof) and, optionally, molecular oxygen at about 200°–300° C and at a pressure and for a time sufficient to convert at least one dichloromethyl group to a carbonyl chloride group.

9 Claims, No Drawings

AROMATIC ACID CHLORIDE PROCESS

The subject invention relates to a process for converting dichloromethyl-benzenes to acid chlorides by reaction with sulfur dioxide, thionyl chloride or sulfur dioxide-thionyl chloride mixtures, optionally in the presence of oxygen.

BACKGROUND

Aromatic acid chlorides are valuable intermediates, particularly poly-acid chlorides, such as isophthaloyl chloride and terephthaloyl chloride, useful for making polyester, polyamide and the like condensation polymers. One proposed route to acid chlorides involves perchlorinating such methyl-aromatic compounds as toluene, m-xylene, p-xylene, and mesitylene in the side chain converting the resulting trichloromethyls to carbonyl chloride groups. The side chain chlorinations are often incomplete and there are also produced dichloromethyl compounds, which cannot be directly converted to the desired acid chlorides by prior methods based on trichloromethyl chemistry.

U.S. Pat. No. 3,124,611 discloses that $SO_2$ under pressure at 200°–400° C. oxidizes aromatic methyl and chloromethyl (-$CH_2Cl$) side chains to carboxyl (-$CO_2H$) groups.

U.S. Pat. No. 3,411,886 discloses that $SO_2$, with $FeCl_3$ catalyst, reacts with aromatic $CCl_3$ compounds at temperatures up to 120° C. to yield thionyl chloride and aromatic acid chlorides.

BRIEF SUMMARY OF THE INVENTION

The subject process for preparing aromatic acid chlorides in general involves heating A. an aromatic compound containing a benzal chloride moiety optionally substituted with one or more ring fluorine, chlorine, dichloromethyl ($CHCl_2$) or carbonyl chloride (COCl) groups, the carbon-containing substituents being non-ortho to each other and to the benzal chloride $CHCl_2$ group, with B. a sulfur reactant chosen from sulfur dioxide ($SO_2$), thionyl chloride ($SOCl_2$) or mixtures thereof and, optionally, C. molecular oxygen in a minor amount sufficient to facilitate the conversion of dichloromethyl groups to carbonyl chloride groups, at a temperature in the range 200° to 300° C under pressure for a time sufficient to convert the benzal chloride to a benzoyl chloride having at least one more COCl group than the starting benzal chloride.

DETAILED DESCRIPTION OF THE INVENTION

Basis for the Invention:

This invention is based on the discovery that sulfur dioxide or thionyl chloride or the combination thereof is effective to oxidatively convert benzal chloride and various substituted benzal chlorides to the corresponding benzoyl chlorides, and that the reaction can be facilitated by small amounts of molecular oxygen. The oxygen use embodiment is particularly valuable when more than one dichloromethyl or a carbonyl chloride group is already present in the molecule.

As described in my co-pending application Ser. No. 875,533, filed concurrently herewith on Nov. 10, 1969, entitled Aromatic Acid Chloride Process, sulfur dioxide, alone or in the presence of thionyl chloride, rapidly converts benzotrichlorides to benzoyl chlorides at 150° – 350° C. Sulfur dioxide reacts much faster with trichloromethyl ($CCl_3$) than with $CHCl_2$ so that when both groups are present in the same molecule the $CCl_3$ group can be made to react substantially exclusively to produce dichloromethyl acid chlorides like $\alpha,\alpha$-dichloro-metatoluyl chloride.

According to the present invention, compounds like $\alpha,\alpha$-dichloro-meta-toluyl chloride can be converted to the poly-acid chloride, particularly when oxygen is employed along with the sulfur dioxide and/or thionyl chloride.

Thus whereas my above-referenced application Ser. No. 875,533 provides a method for converting poly trichloromethyl compounds like $\alpha,\alpha,\alpha,\alpha',\alpha',\alpha'$-hexachloro-meta-xylene to isophthaloyl chloride, the present invention provides a method for converting under-chlorinated xylenes such as $\alpha,\alpha,\alpha',\alpha'$-tetrachloro-meta-xylene and $\alpha,\alpha,\alpha',\alpha',\alpha'$-pentachloro-meta-xylene to the desired isophthaloyl chloride without first having to further chlorinate the underchlorinated xylenes to the hexachloride stage.

Another significant practical aspect of the present invention is that it is operable with $CHCl_2$ compounds that are normally difficult or impractical to convert to $CCl_3$ compounds as acid chloride precursors. For example, side chain chlorination of 2,6-dichloro-toluene stops at the benzal chloride stage; further chlorination tends to degrade the molecule to 1,2,3-trichlorobenzene.

Similarly, when ring chloro substituents are present, it is difficult to chlorinate methyl side chains in the xylenes to the perchloro stage. The present invention obviates the need to do so and thus provides for direct conversion of the underchlorinated $CHCl_2$ groups to COCl groups.

The Dichloromethyl Component:

This component includes benzal chloride (dichloromethylbenzene) and substituted benzal chlorides containing a total of one to three dichloromethyl groups and one or more F, Cl, or COCl groups, provided all the carbon-containing groups ($CHCl_2$ and COCl) are on non-adjacent positions. In other words the combined total of $CHCl_2$ and COCl groups equals one to three. It also includes binuclear analogs of the dichloromethylbenzenes wherein two phenyls, with one or both carrying one or more dichloromethyl groups, are joined through an electron pair bond or an alkylene group such as methylene, ethylidene, propylidene or butylidene, which is inert under the conditions of the reaction. The binuclear analogs may carry F, Cl or COCl substituents as noted above.

Representative substituted benzal chlorides are: 2-chloro-, 2,4-dichloro-, 2,6-dichloro-, pentachloro-, 2-fluoro-, 3-fluoro-, and 2,4-difluorobenzal chloride; $\alpha,\alpha,\alpha',\alpha'$-tetrachloro-m-xylene, i.e., 1,3-bis(dichloromethyl) benzene, $\alpha,\alpha,\alpha',\alpha'$-tetrachloro-p-xylene, $\alpha,\alpha,\alpha',\alpha'$,4-penta-chloro-m-xylene, $\alpha,\alpha,\alpha',\alpha'$,4,5-hexachloro-m-xylene, $\alpha,\alpha,\alpha',\alpha'$,2-pentachloro-p-xylene, $\alpha,\alpha,\alpha',\alpha'$,2,5-hexachloro-p-xylene; $\alpha,\alpha$-dichloro-3-toluyl chloride, i.e., m-dichloromethyl-benzoyl chloride, $\alpha,\alpha$-dichloromethyl-4-toluyl chloride, $\alpha,\alpha$,4-trichloro-3-toluyl chloride, $\alpha,\alpha$,5-trichloro-3-toluyl chloride, $\alpha,\alpha$,4,5-tetrachloro-3-toluyl chloride, α,α,4,5,6-pentachloro-3-toluyl chloride, α,α,2-trichloro-4-toluyl chloride, α,α,2,5-tetrachloro-4-toluyl chloride, 5-dichloromethylisophthaloyl chloride, 3,5-bis(dichloromethyl) benzoyl chloride, p-dichloromethyl-biphenyl, p,p'-bis(dichloromethyl) biphenyl, bis(p-di-chloromethylphenyl)methane, and 2,2-bis(p- dichloromethyl-phenyl)propane.

The preferred dichloromethyl benzenes contain a total of two to three $CHCl_2$ and $COCl$ groups combined and up to three chloro groups since these yield the desired benzene polycarbonyl chlorides. Particularly preferred of this class are those containing a total of two $CHCl_2$ and $COCl$ groups since these yield the most highly desired isophthaloyl and terephthaloyl chlorides.

As disclosed in my above-referenced application Ser. No. 875,533, trichloromethyl benzenes are precursors of benzene carbonyl chlorides. Trichloromethyl substituted benzal chlorides which correspond to carbonyl chloride-substituted benzal chlorides described above may be used to generate those carbonyl chloride-substituted benzal chlorides for use in the present process, conveniently by reaction with $SO_2$ in accordance with said referenced application. Such trichloromethyl benzal chlorides include α,α,α',α',α'-pentachloro-m-xylene, α,α,α',α',α'-pentachloro-p-xylene, such compounds containing ring chloro-substituents, and α,α,α,α',αα',α',α'',α''-octachloro-mesitylene.

The Process - General:

In the broad aspect of this process, an aromatic compound containing one or more dichloromethyl groups as described above and the sulfur reactant are heated together, with and without oxygen to effect the transformation of one or more dichloromethyls to carbonyl chloride groups. The reaction stoichiometry may be represented as:

1. $ArCHCl_2 + SO_2$ (and/or $SOCl_2$) 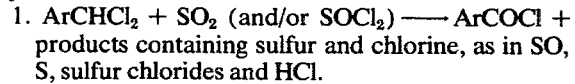 $ArCOCl +$ products containing sulfur and chlorine, as in SO, S, sulfur chlorides and HCl.

It will be noted that in the overall reaction, the $CHCl_2$ group which formally corresponds to an aldehydric oxidation state has been oxidized to the higher carboxylic oxidation state, while the $SO_2$ and/or $SOCl_2$ has been reduced to a lower valent state.

Equation 1 requires one $SO_2$ or $SOCl_2$ molecule for each $CHCl_2$ group to be converted. The actual quantity employed depends on the dichloromethyl compound, the operating temperatures and pressures and the degree of contact between the reactants during reaction. The preferred sulfur reactant contains at least one $SO_2$ molecule for each $CHCl_2$ group.

The temperature required for the -$CHCl_2$ to -$COCl$ conversion usually is in the 200° to 300° C. range, preferably 220° to 260° C. $SO_2$ normally boils at —10° C. and $SOCl_2$ at 77° C., so that for effective contact with the dichloromethyl component at these elevated operating temperatures the reaction is generally conducted under agitation in closed vessels with at least one and usually not more than about 10 moles of the sulfur reactant per $CHCl_2$ group. Larger proportions may be used but are normally not necessary. The reactor loading is adjusted such that the sulfur reactant pressure in the free space is sufficiently great to maintain the reactant, particularly sulfur dioxide, in the phase occupied by the dichloromethyl compound. Normally pressures at the operating temperatures of at least about 200 p.s.i.g. are used, preferably at least 500 p.s.i.g., the higher the better, with pressures greater than about 5000 p.s.i.g. seldom necessary. The upper pressure limitation depends only on the ability of the equipment to withstand pressure. The means employed to agitate the reaction mass should be effective of course to disperse the sulfur dioxide in the reaction mass and provide intimate contact among the reactants.

The sulfur reactant consumed during the reaction may be replenished by feeding additional quantities into the reactor, either into the reaction mass itself or into the free space normally present in closed systems. In one contemplated operating mode, $SO_2$ is continuously fed to the otherwise closed reactor during the reaction to maintain a substantially constant, high $SO_2$ partial pressure in the vapor space and thus provide a high proportion of $SO_2$ dissolved in the reaction mass liquid phase.

Where poly-acid chlorides are to be produced from benzal chlorides bearing 1 to 2 trichloromethyl groups (as in situ precursors of additional $COCl$ groups) there is ordinarily used one to 10 additional moles of $SO_2$ per $CCl_3$ present, preferably 1.1 to five moles per $CCl_3$, and the reaction mixture is heated in a pre-invention process step at 150° to 300° C., preferably 200° to 260° C., to convert the $CCl_3$ groups to $COCl$ groups. As stated earlier, the $CCl_3$ groups react faster than and substantially preferentially to the $CHCl_2$ groups under these conditions so that the corresponding benzal chloride is produced bearing one to two $COCl$ groups corresponding to the original $CCl_3$ groups. In accordance with this invention, the $COCl$-containing dichloromethyl compound is then further heated with $SO_2$ under the conditions of this invention as defined and described above. The overall process of converting $CCl_3$-substituted phenyl-$CHCl_2$ compounds to benzene poly carbonyl chlorides may be conducted in the one reactor employing sufficient $SO_2$ to convert the $CHCl_2$ as well as the $CCl_3$ groups to $COCl$ groups.

Thionyl Chloride:

While thionyl chloride is itself operative, it is preferably employed with $SO_2$. In such mixtures $SOCl_2$ provides additional advantages: It increases $SO_2$ solubility in the reaction mixture and it scavenges water, either water originally present as contaminant or produced in situ, e.g., by reaction of oxygen with the $CHCl_2$ groups. For reasons of economy, from 0.1 to two moles of $SOCl_2$ per mole $SO_2$ are used, preferably 0.2 to one mole/mole. When water is present or oxygen is employed, the $SOCl_2$ quantity should be at least sufficient to convert the water present initially or produced in the reaction to $SO_2$ and HCL. It is advantageous when employing $SOCl_2$, to vent HCl gas during the reaction to avoid excess pressure strain on the reactor.

Oxygen Use:

Oxygen ($O_2$) also facilitates the -$CHCl_2$ to -$COCl$ conversion, although with unsubstituted benzal chloride it tends also to promote tar-forming side reactions. $O_2$, either as oxygen gas or air, is preferably employed with the electronegatively substituted benzal chlorides, particularly those bearing $COCl$ groups, for example α,α-dichloro-meta-toluyl chloride and its ring-chlorinated derivatives.

Although beneficial results may be obtained using from about 0.1 to 0.5 mole of oxygen per $CHCl_2$ group to be converted, the preferred amount is 0.2 to 0.4 molecule per $CHCl_2$, which encompasses what is considered to be the stoichiometric 0.25/1 ratio, by which $CHCl_2$ hydrogens and the oxygen involved are combined to form water.

Reaction Product Recovery:

For all process embodiments, after the reaction is substantially complete, the reaction mass is normally cooled, vented to recover unreacted sulfur dioxide, thionyl chloride, hydrogen chloride and other volatile products, and the mixture worked up to recover the higher boiling acid chloride, which if necessary may be distilled at reduced pressures as disclosed in British Pat. No. 946,491 and U.S. Pat. No. 2,856,425. Where the acid chloride is normally solid or not distillable, it may be purified if desired by crystallization from melts or from solvent as is also well known to the art.

Other Invention Features:

One feature of this invention is that reaction solvents are normally not needed. They may be used, however, and in some cases afford substantial benefits by facilitating contact between the preferred sulfur dioxide reactant and the dichloromethyl compound. Useful diluents include phosphorus oxychloride, the aromatic acid chloride to be produced, and typical inert solvents such as chlorobenzene, orthodichlorobenzene and 1,2,4-trichlorobenzene.

Still another feature of the invention is that moisture need not be excluded from the reaction system since thionyl chloride efficiently scavenges water, yielding sulfur dioxide and hydrogen chloride (not detrimental to the process). Thus thionyl chloride may be advantageously added to the initial reaction charge where water contamination of the reactants or reactor is suspected or has inadvertently occurred.

EXAMPLES

The following examples are intended to illustrate the invention and are not intended to be in limitation thereof.

Other materials and conditions as described above may likewise be employed with advantageous results.

Quantities are in parts by weight unless otherwise stated; the temperatures in °C.

Example 1 - Sulfur Dioxide

Benzal chloride (48.3 grams, 0.3 mole) was charged to a 240 ml capacity shaker bomb lined with Hastelloy C, a corrosion resistant nickel alloy, and equipped with means for sensing internal reaction mass temperatures and free space pressures. The bomb was evacuated, cooled somewhat and sulfur dioxide (32 grams, 0.5 mole) was added, the quantity used corresponding to a 1.67/1 $SO_2/C_6H_5CHCl_2$ mole ratio. The reactor was sealed, heated to 240° in about 0.5 hour and held at 240° for six hours, during which time the autogeneous pressure ranged from an initial 850 psig to a terminal 2100 psig. The bomb was cooled to about 25°, vented to expel and recover HCl and unreacted $SO_2$, and the residual mass distilled to obtain benzoyl chloride in about 85 percent yield; b.p. 101.0°–102.5°/40 mm.

Example 2 - $SO_2$ and $O_2$ 2,6-Dichlorobenzal chloride (69 grams, 0.3 mole) and sulfur dioxide (64 grams, one mole) were added to the shaker bomb reactor of Example 1. With the reactor cooled to $-80°$, oxygen gas (2.4 grams, 0.075 mole or 0.25 mole/mole dichlorobenzal chloride) was admitted, giving a pressure of 200 psig at $-80°$. The reactor was heated at 240° for six hours, then worked up as in Example 1 to yield six grams of 2,6-dichlorobenzoyl chloride, b.p. 121°–129°/15 mm.

Example 3 - $SO_2/SOCL_2$ and $O_2$

Example 2 was repeated using 0.3 mole $SO_2$ and 0.5 mole $SOCl_2$. The reaction mixture was heated at 230° C. for eight hours and worked up as in Example 1 to give 21 grams of 2,6-dichlorobenzoyl chloride and a small amount of 1,2,3-trichlorobenzene.

When the same reaction is conducted without oxygen, 1,2,3-trichlorobenzene predominates over 2,6-dichlorobenzoyl chloride in the reaction product.

Examples 4 to 6

α,α-Dichloro-meta-toluyl chloride (0.3 mole, designated DCTC below) was heated in three separate runs in the reactor of Example 1 with sulfur dioxide (1.0 mole or 3.33 mole/mole DCTC) and (a) without added oxygen, (b) with oxygen (0.075 mole or 0.25 mole/mole DCTC), added at $-80°$ as in Example 2, and (c) with both added thionyl chloride (0.3 mole, or 0.3 mole/mole $SO_2$) and oxygen gas as in (b). The reaction mixtures were held at 240° for four hours and worked up by distillation under reduced pressures to yield isophthaloyl chloride, b.p. 145° at 15 mm of Hg pressure. The results are summarized below.

| Ex. | Conditions | Isophthaloyl Chloride Yield, % |
|---|---|---|
| 4 | $SO_2$ alone | 20 |
| 5 | $SO_2 + O_2$ | 50 |
| 6 | $SO_2 + O_2 + SOCl_2$ | 90 |

Example 7

A 70/30 weight percent mixture of α,α,α',α'-tetrachloro-meta-xylene and α,α,α',α',α'-pentachloro-meta-xylene, obtained as by-product in the side chain perchlorination of meta-xylene, was heated at 245° for five hours with three parts $SO_2$ per part mixture (corresponding to 12 moles $SO_2$ per mole mixture or 6 moles $SO_2$ per chlorinated side chain methyl group) and 0.1 part oxygen per part mixture (or about 0.25 mole per $CHCl_2$ group). The yield of isophthaloyl chloride, recovered by distillation at reduced pressure, was substantially quantitative.

Example 8 - $SOCl_2$

The Example 1 procedure was repeated with thionyl chloride (0.3 mole) in place of sulfur dioxide as the reactant. Benzoyl chloride was obtained in high yield.

Example 9

The Example 1 procedure was repeated with 67 parts (0.3 mole) of α,α-dichloro-m-toluyl chloride and 54 parts (0.45 mole) of thionyl chloride. The mixture was heated at 240° for four hours, then distilled under reduced pressure to recover, as forerun, a mixture of $SOCl_2$ and $S_2Cl_2$ and 64 grams of organic distillate analyzing 29 percent α,α,α-trichloro-m-toluyl chloride, 26 percent isophthaloyl chloride and 45 percent unreacted α,α-dichloro-m-toluyl chloride. This product mixture was again heated with 36 parts (0.3 mole) $SOCl_2$ for four hours at 240°. The resulting product, 58 parts distilled, contained 40 percent $\alpha,\alpha,\alpha$-trichloro-m-toluyl chloride, about 60% isophthaloyl chloride, b.p. 130°–135° at 13 mm Hg pressure, and practically nil $\alpha,\alpha$-dichloro-m-toluyl chloride.

As seen from the foregoing description and examples, the subject invention provides a novel, commercially attractive process for converting aromatic $CHCl_2$ groups to $COCl$ groups.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing aromatic acid chlorides which comprises heating (a) an aromatic compound having one or more dichloromethyl groups bonded to aromatic carbon atoms, the substituents on the other aromatic carbon atoms being selected from hydrogen, fluorine, chlorine and carbonyl chloride, all carbon-containing substituents being non-ortho to each other, with (b) a sulfur reactant selected from sulfur dioxide, thionyl chloride and mixtures thereof at a temperature of 200° to 300° C. and at a pressure of at least 200 psig and for a time sufficient to convert at least one dichloromethyl group to a carbonyl chloride group.

2. Claim 1 wherein the sulfur reactant is present in the amount of from one to about 10 moles per dichloro-methyl group.

3. Claim 2 wherein the sulfur reactant is a mixture of sulfur dioxide and thionyl chloride, the molar ratio of thionyl chloride:sulfur dioxide being about in the range of 0.11 to 2:1.

4. Claim 3 wherein the molar ratio is in the range of 0.2:1 to 1:1.

5. Claim 2 wherein there is also initially present about 0.1-0.5 molecules of molecular oxygen per dichloro-methyl group.

6. Claim 5 wherein the aromatic compound is a benzal chloride having one to two substituents individually selected from dichloromethyl and carbonyl chloride groups attached to ring positions non-ortho to each other and to the benzal chloride dichloromethyl group and zero to three ring chloro groups.

7. Claim 6 wherein the sulfur reactant is sulfur dioxide.

8. Process for preparing benzoyl chlorides which comprises heating (a) a benzal chloride having zero to two ring chloro groups and one ring substituent nonadjacent to the dichloromethyl group of the benzal chloride selected from dichloromethyl and carbonyl chloride groups with (b) 1.1 to five molecules, per dichloromethyl group, of a sulfur reactant selected from sulfur dioxide, thionyl chloride and mixtures thereof and (c) 0.2 to 0.4 molecules, per dichloromethyl group, of molecular oxygen at 200° to 300° C. and a pressure of at least 200 p.s.i.g. for a time sufficient to convert at least one dichloromethyl group to a carbonyl chloride group.

9. Process for preparing isophthaloyl chloride which comprises heating (a) a benzal chloride selected from $\alpha,\alpha,\alpha',\alpha'$-tetrachloro-m-xylene, $\alpha,\alpha,\alpha,\alpha',\alpha'$-pentachloro-m-xylene, $\alpha,\alpha$-dichloro-m-toluyl chloride or mixtures of any two or more thereof with (b) sulfur dioxide and molecular oxygen at a temperature in the range of 200°–300° C. and pressure of at least 200 psig and for a time sufficient to convert all substituents to carbonyl chloride groups.

* * * * *